United States Patent
Gloge et al.

[11] 3,823,997
[45] July 16, 1974

[54] GRADED-INDEX OPTICAL FIBER

[75] Inventors: Detlef Christoph Gloge, Red Bank; Enrique Alfredo Jose Marcatili, Rumson, both of N.J.

[73] Assignee: Bell Telephone Laboratories Incorporated, Murray Hill, N.J.

[22] Filed: June 18, 1973

[21] Appl. No.: 370,948

[52] U.S. Cl. ...... 350/96 WG, 65/DIG. 7, 350/96 R, 350/175 GN
[51] Int. Cl. .............................................. G02b 5/14
[58] Field of Search ...... 350/96 WG, 175 GN, 96 R

[56] References Cited
UNITED STATES PATENTS
3,614,197    10/1971    Nishizawa et al. ............. 350/96 WG
3,785,718    1/1974    Gloge............................. 350/96 WG Primary Examiner—John K. Corbin
Attorney, Agent, or Firm—S. Sherman

[57] ABSTRACT

It is shown that minimum delay distortion is realized in a graded-index multimode optical fiber comprising an inner core of radius $a$ surrounded by a suitable cladding when the refractive index $n(r)$, at any radius $r$ less than $a$, is given by $$n(r) = n_0 [1 - 2\Delta(r/a)^{2-2\Delta}]^{1/2},$$

where $n_0$ is the refractive index at the center of the fiber core, $a$ is the core radius, $n_c$ is the refractive index of the core at $r = a$, and $\Delta = n_0 = n_c/n_0$. A variety of suitable claddings are described.

9 Claims, 5 Drawing Figures

PATENTED JUL 16 1974         3,823,997

GRADED-INDEX OPTICAL FIBER

This application relates to graded-index optical fibers.

BACKGROUND OF THE INVENTION

As is known, electromagnetic wave energy propagating in a particular modal configuration along an optical fiber, comprising a core of uniform refractive index surrounded by a cladding of lower refractive index, is uniquely characterized by a ray progressing along the fiber at a specified angle to the fiber axis. More particularly, the higher the mode order, the larger the angle the ray makes with the axis. As a consequence of this, each of the modes in a multimode optical fiber travels a different total distance between the input end and the output end of the fiber. This, in turn, produces a dispersion of the signal wave as the energy associated with each of the modes tends to arrive at the output end at a slightly different time. The resulting delay distortion in such a fiber, defined as the difference in the times it takes the fastest mode and the slowest mode to traverse a given length, $L$, of fiber, is given by $$T_1 = L/c \, (n_o - n_c), \quad (1)$$

where $n_o$ is the refractive index of the core;
$n_c$ is the refractive index of the cladding;
and
$c$ is the velocity of light.

It has been found that this delay distortion can be reduced by grading the index profile of the fiber core. In one of the better graded-index fibers (such as is described by S. E. Miller in an article entitled "Light Propagation in Generalized Lens-Like Media," published in the November 1965 issue of the Bell System Technical Journal) wherein the refractive index of the fiber core decreases as a function of the square of the distance from the fiber center, the total dispersion $T_2$ is only $$T_2 = L/c \, n_o/2 \, [n_o - n_c/n_o]^2, \quad (2)$$

where $n_o$ is the refractive index at the center of the fiber core;
and
$n_c$ is the refractive index at the outer periphery of the fiber core.

The broad object of the present invention is to reduce further the delay distortion caused by mode dispersion in multimode optical fibers.

SUMMARY OF THE INVENTION

In an optical fiber, in accordance with the present invention, the refractive index profile of the fiber core is so graded that, notwithstanding the fact that the rays characterizing the higher order modes travel greater total distances along the fiber, some of them nevertheless arrive at the fiber output end earlier than the lower order modes. In a preferred embodiment, the index profile is such that the group velocity of the lowest order mode and the group velocity of the highest order mode are equal. For this preferred configuration, the maximum delay, $T_3$, is $$T_3 = 1/4 \, T_2, \quad (3)$$

which represents a four-fold improvement over the prior art parabolic index profile.

It is an advantage of the present invention that the capacity of an optical wave communication system can be significantly increased simply by modifying the index profile of the optical fiber transmission line.

This and other objects and advantages, the nature of the present invention and its various features, will appear more fully upon consideration of the illustrative embodiment now to be described in detail in connection with the accompanying drawings.

DETAILED DESCRIPTION

Figure 1:
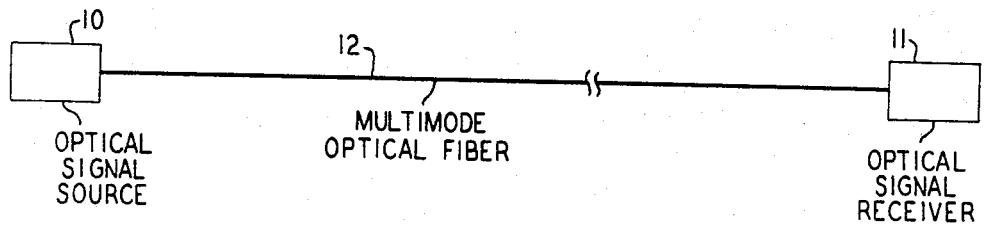
FIG. 1 shows, in block diagram, an optical commnication system.

Referring to the drawings, FIG. 1 shows, in block diagram an optical communication system comprising an optical signal source 10, an optical signal receiver 11, and a multimode optical fiber transmission line 12 connecting the source to the receiver.

Figure 2:
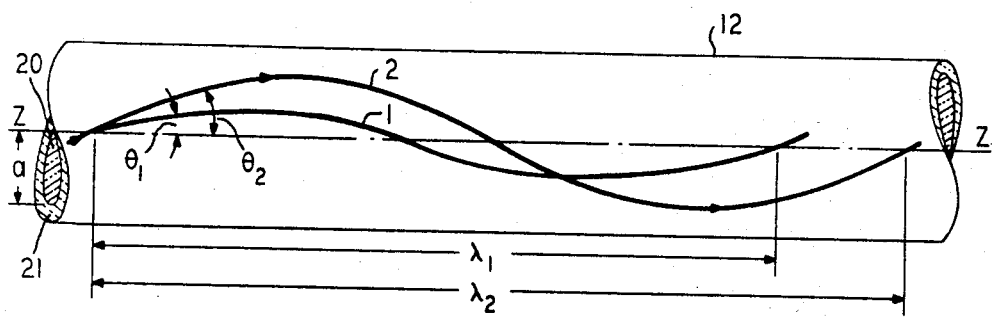
FIG. 2 shows a section of optical fiber and the trajectory along said fiber of two different rays characteristic of different order modes.

The present invention relates to the transmission line portion of the system, a segment of which is shown in FIG. 2, and in particular to means for reducing the delay distortion produced in a multimode optical fiber. The fiber typically comprises a core region 20, of radius $a$, surrounded by a cladding 21.

As indicated hereinabove, each particular group of modes propagating along a multimode optical fiber can be characterized by a single ray which crosses the fiber axis at a particular angle. For purposes of explanation, two rays, 1 and 2, are illustrated in FIG. 2, where the lower order mode ray 1 is shown propagating at an angle $\theta_1$ to the fiber axis Z—Z, and a higher order mode ray 2 is shown directed at a larger angle $\theta_2$ to the fiber axis. Each ray oscillates about the axis with a characteristic wavelength that is a function of the index profile of the fiber.

Figure 3:
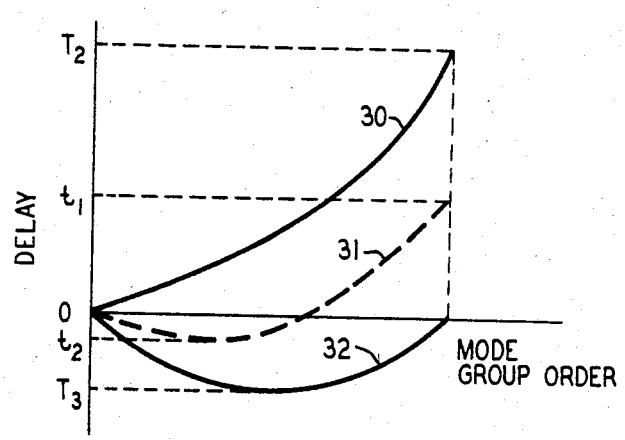
FIG. 3, included for purposes of explanation, shows the variation of delay as a function of mode order for optical fibers having different index profiles.

As will be noted from FIG. 2, the total distance traveled by ray 2 as it progresses along the fiber is greater than the total distance traveled by ray 1. Since the velocity with which a ray travels varies as a function of the refractive index, the instantaneous velocity for each ray varies along its trajectory. Thus, the total time it takes for the respective rays to cover the same longitudinal distance depends upon the total distance each ray travels and the velocity of each ray averaged over that distance. For the typical prior art fiber, the time required to cover a given longitudinal distance L increases as the mode order increases. This relationship is indicated by curve 30 in FIG. 3 which is a plot of delay as a function of mode group order. The designation "mode group" in FIG. 3 is used to indicate that there are, in general, groups of modes that have the same delay. However, in each instance, the higher the mode group order, the greater the delay. In particular, for the parabolic index fiber, the maximum delay $T_2$, as given hereinabove by equation (2), is $$T_2 = L/c\ n_o/2\ [n_o - n_c/n_o]^2.$$

While it has been shown by S. Kawakami et al, in a paper entitled "An Optical Waveguide With the Optimum Distribution of the Refractive Index With Reference to Waveform Distortion," published in the October 1966 issue of the IEEE Transactions on Microwave Theory and Techniques, pp. 814–818, that there is no index profile that can completely equalize the group velocities of all of the propagating modes in an optical fiber, the present invention provides an improvement over the parabolic index fiber, and the fiber described in the above-identified article. In particular, the maximum delay distortion is reduced, in a fiber in accordance with the present invention, by modifying the refractive index profile such that the lowest order mode is no longer the fastest mode. While all of the higher order modes still travel a greater total distance than the lowest order mode, by modifying the index profile in the manner to be described, the average velocities of at least some of the higher order modes are sufficiently greater than the average velocity of the lowest order modes such that the total propagation time, which is equal to the total distance traveled divided by the average velocity, is less for at least some of the higher order modes. In this type of delay vs. mode order characteristic, illustrated by curve 31, the fastest modes are a group of intermediate modes, not the lowest order mode, and the total delay difference is given by $t_1 - t_2$.

In the preferred embodiment, the index profile is such that the highest order modes and the lowest order modes have the same group velocity. This results in the delay vs. mode characteristic illustrated by curve 32, and is obtained when the refractive index profile is given by $$n(r) = n_o\ [1 - 2\Delta(r/a)^{2-2\Delta}]^{1/2}, \tag{4}$$

where $n(r)$ is the refractive index at any distance $r \leq a$ from the center of the fiber core;
$a$ is the radius of the fiber core;
$n_o$ is the refractive index at the center of the fiber core;
$\Delta = n_o - n_c/n_o$;
and
$n_c$ is the refractive index of the fiber core at radius $a$.

The maximum delay, $T_3$, for this case, is given by $$T_3 = L/c\ n_o/8\ [n_o - n_c/n_o]^2, \tag{5}$$

which, it will be noted, is equal to $\frac{1}{4}T_2$. Thus, the total dispersion in accordance with the preferred embodiment of the present invention is one-fourth that of the prior art parabolic index fiber.

The cladding for a fiber, in accordance with the present invention, can be any one of the several described in the copending application by D. C. Gloge, Ser. No. 280,033, filed Sept. 11, 1972, now U.S. Pat. No. 3,785,718, including (a) a lossy jacket; (b) a low-loss jacket of refractive index $n_c$; (c) a low-loss jacket of refractive index $n$, where $n_c < n < n_o$; or (d) a low-loss intermediate jacket of prescribed thickness whose refractive index is less than $n_c$, surrounded by a lossy outer jacket. The relationships among the various parameters of the above-described claddings are described more fully in the above-cited copending application which is incorporated herein by reference.

Figure 4:
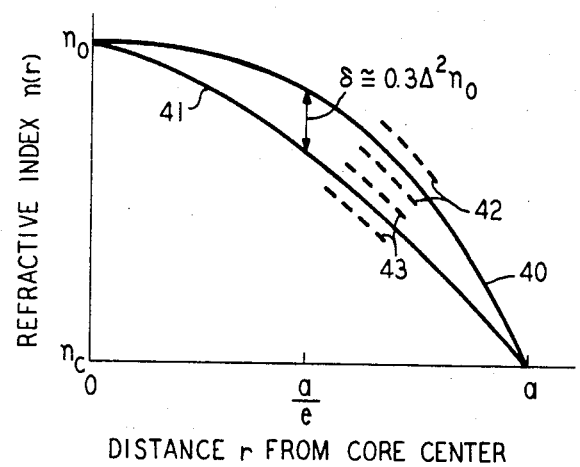
FIG. 4 shows the index profile for a preferred prior art optical fiber and for a fiber in accordance with the present invention.

FIG. 4, included for purposes of explanation, shows the variations in the refractive index of a fiber having a parabolic index profile (curve 40), and a fiber having an index profile in accordance with the present invention (curve 41), where both fibers have the same maximum refractive index $n_o$, the same minimum refractive index $n_c$, and the same core radius $a$. As such, the two curves intersect at $r = o$, and at $r = a$. Over the region between $r = o$ and $r = a$, the curves diverge such that the refractive index at any radius is always less in a fiber constructed in accordance with the present invention. It is this more rapid tapering of the refractive index which results in the higher group velocity of the intermediate order modes, and the modified delay characteristic illustrated by curve 32 in FIG. 3.

Techniques for fabricating fibers having graded refractive indices are well known. See, for example, an article by Kitano et al, entitled "A Light-Focusing Fiber Guide Prepared by Ion-Exchange Techniques," published in The Proceedings of the 1st Conference on Solid State Devices, Tokyo, 1969. More recently, an alternate method was disclosed by P. C. Schultz in a talk entitled "Preparation of Very Low Loss Optical Waveguides," a summary of which is published in the April 1973 issue of the American Ceramic Society Bulletin. However fabricated, it will be recognized that the resulting index profile may not precisely follow either of the curves 40 or 41 but, rather, will only approximate these curves, falling within a range about each of the curves 40 and 41 as defined by the particular manufacturing tolerances. For example, a reasonable tolerance at the present state of the art would be approximately ±0.5 percent of the difference between the maximum and minimum refractive indices (i.e., ±0.005$\Delta n_o$). Thus, a fiber manufactured to conform to curve 40 would have an index profile which would be expected to fall within the range defined by the above-noted manufacturing tolerance, as represented by the dashed curves 42. Similarly, a fiber manufactured to conform to curve 41 would typically fall within a corresponding range defined by dashed curves 43. So long as these ranges do not overlap, one can readily distinguish the two index characteristics. For the characteristics illustrated, the maximum difference $$\delta \cong 0.3\ \Delta^2 n_o \tag{6}$$

occurs at radius $r = a/e$, where $e$ is the natural logarithmic base equal to 2.73. Since the tolerance, as given above, is ±0.005$\Delta n_o$, the profiles can be distinguished so long as $\delta \geq 0.01\Delta n_o$. Substituting for $\delta$, we obtain:

$$0.3\Delta^2 n_o \geq 0.01\Delta n_o \quad (7)$$

or $$\Delta \geq 0.033. \quad (8)$$

Equation (8) gives an approximate minimum value of $\Delta$ for which fiber profiles 40 and 41 can be readily distinguished using presently available manufacturing techniques. In any event, a fiber having an index profile which substantially conforms to curve 41, within the existing manufacturing tolerance, will display less dispersion than one approximating a parabolic index. For example, for any given error, $E$, the actual delay, $T_{act}$, between the fastest and the slowest modes is related to the optimized delay $T_3$ by $$T_{act} = (1 + |E|/0.3n_o\Delta^2)^2 T_3. \quad (9)$$

Assuming maximum manufacturing error, $E = 0.005\Delta n_o$, equation (9) becomes $$T_{act} = (1 + 0.005\Delta n_o/0.3n_o\Delta^2)^2 T_3 \quad (10)$$

or $$T_{act} = (1 + 0.005/0.4\Delta)^2 T_3. \quad (11)$$

For the particular case where $n_o = 1.5$ and $n_c = 1.45$, one obtains from equation (11) that $$T_{act} = 9/4 T_3 \quad (12)$$

Substituting for $T_3$ from equation (3), we obtain $$T_{act} = 9/16 T_2. \quad (13)$$

Equation (13) states that for the specified $\Delta$, a graded-index fiber in accordance with the present invention will have, at the very worst, an actual delay distortion that is slightly less than one-half the delay distortion of the prior art parabolic graded-index fiber.

Figure 5:
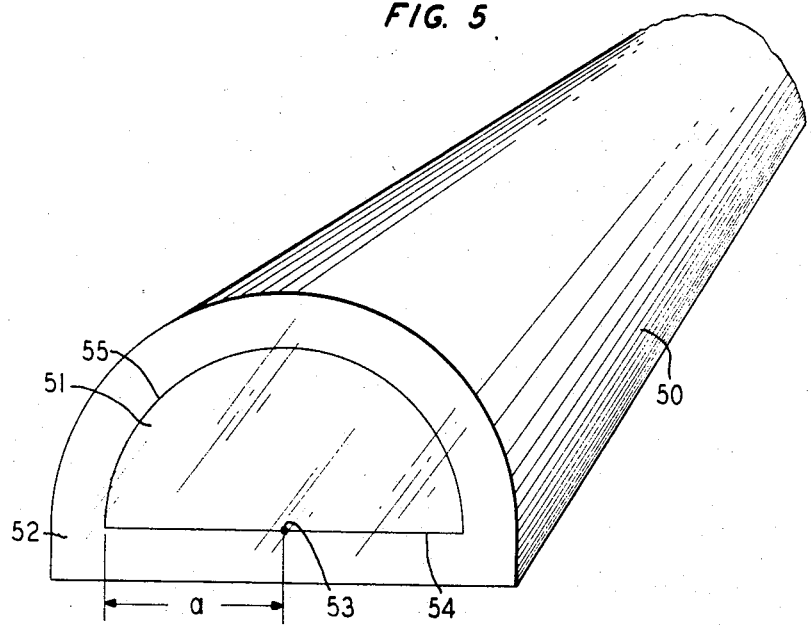
FIG. 5 shows an alternate embodiment of the invention.

It will be recognized that the above-described index profile can be applied to the so-called "half-guide" described in the copending application by R. Kompfner, Ser. No. 361,516, filed May 18, 1973. This would include, for example, the half-fiber 50, illustrated in FIG. 5, comprising a semicircular core region 51, surrounded by a cladding 52. In this configuration, the refractive index has a maximum value $n_o$ at a point 53 located at the center of the planar surface 54 of core 51, and decreases as a function of the distance $r$ from point 52 as called for by equation (4).

The cladding 52 can be a low-loss material of refractive index $n_c$ or, alternatively, the cladding can include two different portions. The first portion, disposed along the curved surface 55 of the core can be any one of the several claddings described hereinabove. The second portion, disposed along the planar surface 54 of the core can include a metallized reflecting surface.

Thus, it will be recognized that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An optical fiber comprising:
 an inner core region surrounded by an outer cladding;
 characterized in that the refractive index $n(r)$ of said core region varies as a function of the radial distance $r$ from the center of said core substantially as $$n(r) = n_o [1 - 2\Delta(r/a)^{2-2\Delta}]^{1/2},$$

where
 $a$ is the radius of said core;
 $n_o$ is the refractive index at the center of said core;
 $n_c$ is the refractive index of said core at $r = a$.

2. The fiber according to claim 1 wherein said cladding is a low-loss material of refractive index $n_c$.

3. The fiber according to claim 1 where said cladding is a lossy jacket.

4. The fiber according to claim 1 wherein said cladding is a low-loss jacket of refractive index $n$, where $n_c < n < n_o$.

5. The fiber according to claim 1 wherein said cladding includes an intermediate jacket of low-loss material having a refractive index less than $n_c$, surrounded by an outer, lossy layer of material.

6. The fiber according to claim 1 wherein $\Delta$ 0.033.

7. An optical fiber comprising:
 an inner core region having a semicircular cross-section surrounded by an outer cladding;
 characterized in that the refractive index $n(r)$ of said core region varies as a function of the radial distance $r$ from the center of the planar surface of said core substantially as $$n(r) = n_o [1 - 2\Delta(r/a)^{2-2\Delta}]^{1/2}$$

where
 $a$ is the radius of said core;
 $n_o$ is the refractive index at the center of said planar surface;
 and
 $n_c$ is the refractive index of said core at $r = a$.

8. The fiber according to claim 7 wherein said cladding is a low-loss material of refractive index $n_c$.

9. The fiber according to claim 7 wherein the cladding along the planar surface of said core region includes a metallized reflecting surface.

* * * * *

UNITED STATES PATENT OFFICE
CERTIFICATE OF CORRECTION

Patent No. 3,823,997  Dated July 16, 1974

Inventor(s) Detlef C. Gloge et al.

It is certified that error appears in the above-identified patent and that said Letters Patent are hereby corrected as shown below:

In the abstract, line 9, change "$= n_o = n_c/n_o$" to -- $\Delta = (n_o - n_c)/n_o$ --. Column 1, line 25, equation (1) should appear as shown below:

$$T_1 = (L/c)(n_o - n_c)$$

Column 1, line 45, equation (2) should appear as shown below:

$$T_2 = (L/c)(n_o/2)[(n_o - n_c)/n_o]^2$$

Column 2, line 5, equation (3) should appear as shown below:

$$T_3 = (1/4)T_2$$

Column 3, line 10, the equation should appear as shown below:

$$T_2 = (L/c)(n_o/2)[(n_o - n_c)/n_o]^2$$

Column 3, line 57, the equation should appear as shown below:

$$\Delta = (n_o - n_c)/n_o$$

Column 3, line 65, the equation should appear as shown below:

$$T_3 = (L/c)(n_o/8)[(n_o - n_c)/n_o]^2$$

UNITED STATES PATENT OFFICE
CERTIFICATE OF CORRECTION

Patent No. 3,823,997　　　　　　　　Dated July 16, 1974

Inventor(s) Detlef C. Gloge et al.　　　　Page - 2

It is certified that error appears in the above-identified patent and that said Letters Patent are hereby corrected as shown below:

Column 5, line 40, equation (12), should appear as shown below:

$$T_{act} = (9/4)T_3$$

Column 5, line 45, equation (13), should appear as shown below:

$$T_{act} = (9/16)T_2$$

Column 6, line 24, change exponent "2_2Δ" to -- 2-2Δ --;

line 51, change exponent "2_2Δ" to -- 2-2Δ --.

Signed and sealed this 7th day of January 1975.

(SEAL)
Attest:

McCOY M. GIBSON JR.　　　　　　　　　C. MARSHALL DANN
Attesting Officer　　　　　　　　　　Commissioner of Patents